Figure 5:
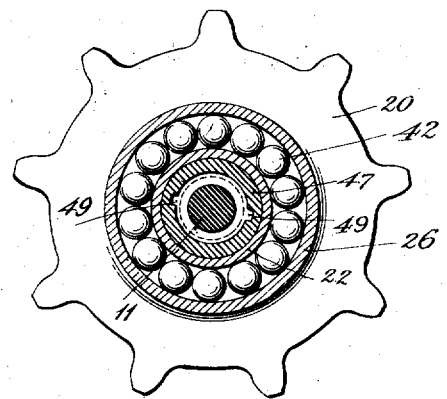

A. F. ROCKWELL.
VARIABLE SPEED MECHANISM.
APPLICATION FILED JUNE 4, 1906.
942,220.
Patented Dec. 7, 1909.
2 SHEETS—SHEET 1.
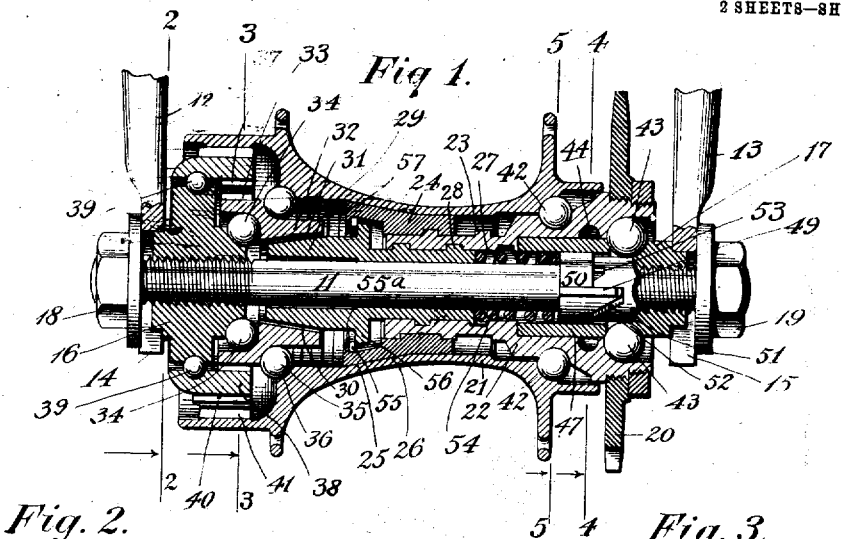
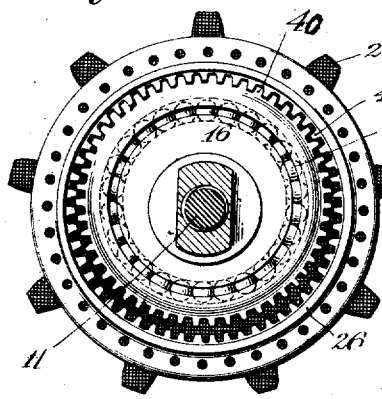
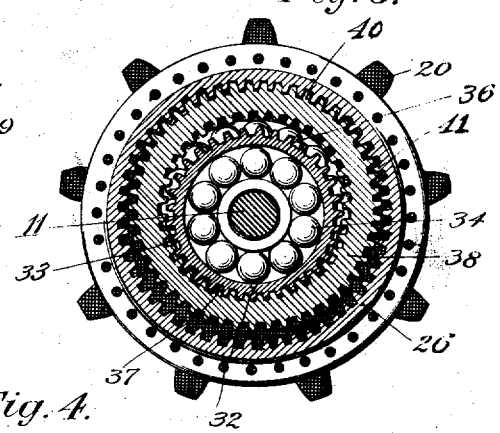
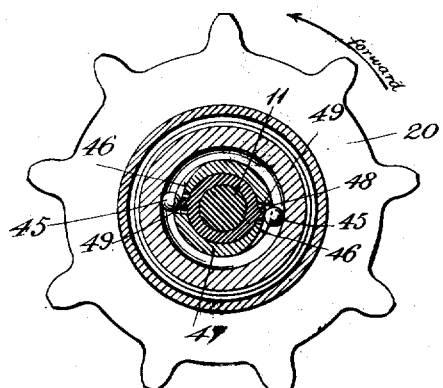
WITNESSES:
Chas. F. Schmelz
B. F. Funk
INVENTOR.
A. F. Rockwell
BY Giles _____
his ATTORNEY.

A. F. ROCKWELL.
VARIABLE SPEED MECHANISM.
APPLICATION FILED JUNE 4, 1906.

942,220.

Patented Dec. 7, 1909.
2 SHEETS—SHEET 2.

WITNESSES:
Chas. F. Schnely
B. F. Funk

INVENTOR.
A. F. Rockwell,
BY
his ATTORNEY.

UNITED STATES PATENT OFFICE.

ALBERT F. ROCKWELL, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

VARIABLE-SPEED MECHANISM.

942,220. Specification of Letters Patent. Patented Dec. 7, 1909.

Application filed June 4, 1906. Serial No. 320,066.

*To all whom it may concern:*

Be it known that I, ALBERT F. ROCKWELL, a citizen of the United States, residing at Bristol, county of Hartford, State of Connecticut, have invented a certain new and useful Variable-Speed Mechanism, of which the following is a full, clear, and exact description, such as will enable others skilled in the art to which it appertains to make and use the same, reference being had to the accompanying drawings, forming part of this specification.

This invention relates to a change speed mechanism.

One object of the invention is to provide means for efficiently and expeditiously changing the speed of a driven part with relation to the speed of its driving part.

Another object of the invention is to adapt the change speed mechanism to the wheel hub of a vehicle, as for example a bicycle, so that the wheel hub with which it coöperates may be driven at different speeds for well understood reasons.

Another object of the invention is to provide means for permitting the driven part, whose speed may be changed, to coast or run free when the speed of said driven part exceeds the speed of the actuator or driving part.

Another object of the invention is to provide means for attaching the change speed mechanism to the driving wheel hub of a bicycle, so that the change in the speed may be effected by back-pedaling and in such a manner that upon forward pedaling the particular speed which has been selected by the back-pedaling movement will be effected.

A further object of my invention is to provide means whereby the high speed clutch will be positively held out of action when the low speed clutch is in action and vice versa.

A further object of my invention is to provide means for exerting a maximum power on the movable part when the low speed is used, this being desirable particularly when the change speed mechanism is employed in a bicycle hub, because the low speed is usually employed for propelling up an incline.

Other objects and advantages as well as the novel details of construction of this invention will be specifically set forth hereinafter, it being understood that changes in form, proportion and minor details of construction may be resorted to without departing from the spirit of the invention or sacrificing any of the advantages thereof.

Figure 6:
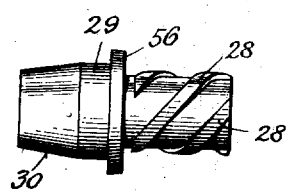
Figure 7:
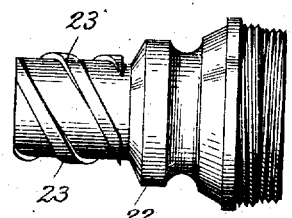
Figure 8:
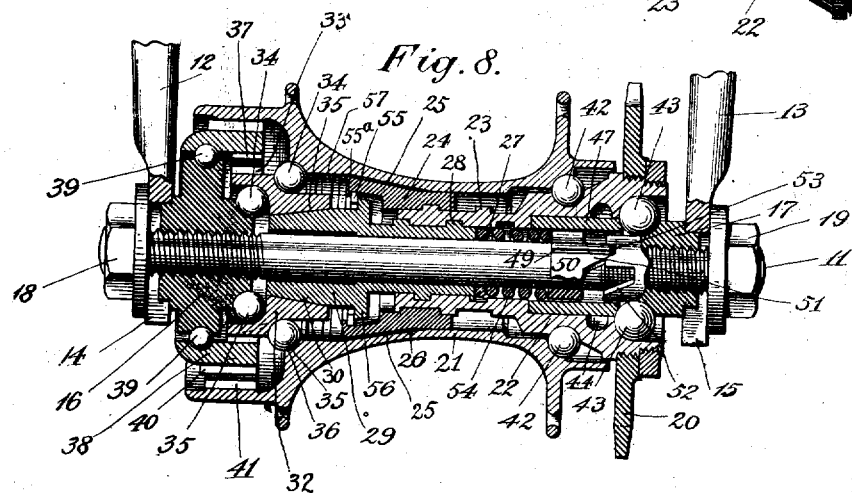

In the drawings: Figure 1 is a longitudinal, sectional view through a change speed mechanism applied to the rear wheel hub of a bicycle; Fig. 2 is a sectional view on the line 2—2 of Fig. 1; Fig. 3 is a sectional view on the line 3—3 of Fig. 1; Fig. 4 is a sectional view on the line 4—4 of Fig. 1; Fig. 5 is a sectional view on the line 5—5 of Fig. 1; Fig. 6 is a detail view of the low speed clutch used in the particular form shown; Fig. 7 is a detail view of the clutch actuator forming a part of the construction shown and with the sprocket or driver removed; and Fig. 8 is a longitudinal, sectional view through a wheel hub to which one form of my invention is applied, the low speed clutch being shown in position to drive the hub.

In the form of my invention illustrated in the accompanying drawings, I have illustrated the change speed mechanism as being adapted to drive a wheel hub at different speeds, and means is illustrated for conveniently shifting certain movable devices whereby the rider may attain the speed at which he desires to drive the hub by merely reversing the direction of rotation of the driver, and this may be conveniently performed by back-pedaling.

In the form shown, I employ a rigid axle 11, secured in the rear forks 12 and 13 of the bicycle frame in any well known manner, as for example, by coupling the bifurcated ends 14 and 15 of the rear forks between the bearing cones 16 and 17, at the respective ends of the axle, and the nuts 18 and 19. The bearing cones 16 and 17 may be threaded or otherwise secured upon the axle and form rigid bearings for certain coöperating devices which assist in providing the change speed mechanism and which will be referred to hereinafter.

As heretofore explained the change speed is effected through the driver which may be a sprocket 20. The driven part in the present instance is the hub 21, which receives its motion from the driver 20 through the medium of intermediate mechanism which may be actuated to connect the driver direct to the driven part, so as to cause the driven part to move at the same speed as the driving part, or the driven part may be connected to the driving part through the medium of a reducing gear, which will permit the driven part to receive motion from the driving part, but at a reduced speed.

Projecting laterally from the sprocket 20 and extending longitudinally within the hub, is a clutch actuator illustrated as a sleeve 22 having right and left hand threads, the right hand threads being on the exterior of the actuator, while the left hand threads are on the inner circumference of the sleeve, it being apparent by reference to Fig. 1, that the sleeve or actuator 22 is spaced a suitable distance away from both the axle 11 and the hub 21. The exterior threads 23 of the clutch actuator are engaged by a corresponding portion of a shiftable high speed clutch member 24 having a clutch face 25 adapted to efficiently engage the inner circumference of the hub, as for example at 26. The inner threads 27 of the clutch actuator engage similar threads 28 on the reduced end of a shiftable low speed clutch member 29 whose clutch face 30 is adapted to move into and out of frictional contact with the flared portion 31 of a gear clutch 32 comprising an annulus having exterior teeth 33. This gear is concentrically mounted about the axle and it is supported between anti-friction bearings 34 carried by the cone 16 and anti-friction bearings in a recess way 36 in the hub 21. This gear 32 is at times free from engagement with the clutch member 29, but it is at all times in engagement with the interior teeth 37 of an annulus 38 mounted eccentrically about the axle and gear 32 and eccentrically to the hub. This annulus 38 may be conveniently supported on anti-friction devices 39 carried by the cone 16 and its exterior teeth 40 are at all times in mesh with the teeth 41 within the hub 21, so that any rotary movement given to the gear 32 will impart movement to the gear 38 and through it to the hub 21. By eccentrically mounting the intermediate gear 38 I am enabled to mesh the gear 32 directly with the gear 38 and thus dispense with the several pinions necessary to make up a planetary gear and commonly employed in such mechanism for reducing the speed, and furthermore, by this arrangement less space is required for the introduction of the reducing gear, and while the construction of reducing gear is simplified, it is very effective, causing but little frictional contact between the teeth of the coöperating parts, and this I consider a material advantage under certain conditions, as for example, when the change speed gear is applied to a wheel hub.

I have described the high speed clutch and the low speed clutch and I will now proceed to describe the manner of operating them so that one will not be applied when the other is in action.

As heretofore stated all of the devices are controlled from the master element 22 heretofore described as the clutch actuator and which receives its movement through the rigid driving part or sprocket 20. This actuator 22 is supported within the hub 21 on the anti-friction device 42 and upon the cone 17 by the anti-friction devices 43. Within the inner wall of the actuator 22 is a recess, way or groove 44, to receive locking balls of pawls 45, which run free when the driver is moving in a forward direction, but which on back-pedaling ride on the cam grooves 46 in the sleeve 47 to lock the actuator and said sleeve 47 together. The sleeve 47 is provided with elongated slots 48 through which project the ribs 49 of a longitudinally and axially shiftable member 50. This shiftable member 50 is provided with an engaging tongue 51, having a cam face which may be projected into the cam recess 52 in the cone 17 rigid on the axle 11, or into a relatively shallow recess 53 in said cone. Interposed between the shiftable device 50 and the low speed clutch member 29 is a spring 54 which is normally passive, that is to say this spring is normally not under tension, as shown in Fig. 1. Now suppose movement is imparted to the driver in a forward direction, the thread 23 on the actuator 22 will be effective in moving the high speed clutch 24 into engagement with the inner surface of the hub, so that the hub and driver will move at the same speed and the low speed clutch will be normally held in the position shown in Fig. 1 (or away from its clutch member) by a ring 55 held by a flange 55ª on the end of the high speed clutch and which may engage a flange 56 projecting from the low speed clutch 29, as shown in Fig. 1. If the hub overruns the clutch member 24, that is to say, if its speed exceeds the speed of the driver, as for example in moving down an incline, the hub will be permitted to run free. But as soon as the speed of the driver exceeds that of the hub, the high speed clutch 24 will immediately pick it (the hub) up and continue to propel it. This tendency of the high speed clutch to engage the hub will be augmented by the expansive spring 57 which at all times bears against one end of the clutch member 24. Suppose the operator desires to change his speed to the low speed, as for example in propelling a bicycle up an incline. A rearward rotation of the driver 20 will impart a rearward rotative movement to the member 22, so that the pawls 45 will ride on the cam faces 46 to lock the sleeve 47 and the actuator 22 together. The continued rearward rotative movement of the driver 20 will be effective in turning the member 50, so that its cam face 51 will ride on the cam face of the recess 52 and the tongue 51 will engage the relatively shallow recess 53, so as to hold the member 50 in advanced position and put the spring 54 under compression.

It will be noted that the arrangement of the intermeshed threads between the low speed clutch 29 and the actuator 22 causes said clutch to engage the clutch member 32 upon forward rotation of the driver 20. When the spring 54 has been placed under compression, as above described, as the low speed clutch 29 is shifted into engagement with its clutch member 32, the high speed clutch member, having been carried from frictional engagement with the inner wall of the hub, will be held out of contact therewith through the medium of the flange 56 which will abut against the ring 55. The forward pedaling will in nowise interfere with the application of the low speed clutch, because the high speed clutch will be held out of engagement with the hub and the expansive force of the spring 54 will be sufficient to hold the high speed clutch out of frictional engagement with the hub of the wheel. When it is desired to return to the high speed a reversal of the movement of the driver, as in back-pedaling will throw the tongue 51 out of engagement with the recess 53 and let it engage the relatively deep recess 52. Upon forward pedaling, then, the high speed clutch will be thrown into engagement with the interior wall of the hub and the low speed clutch will be moved out of engagement with its clutch member on account of the tension of the spring 54 having been destroyed.

It is to be noted that the springs are capable of exerting different tensions upon their clutch members, and that in the present embodiment of this invention, the spring 57 is a relatively weak spring while the spring 54 is a relatively strong spring. Therefore, when the tension is relieved on the spring 54, the spring 57 will be effective in exerting a sufficient tension against the clutch 24 so as to insure its moving into clutching position with the hub. When the spring 54 is put under compression, however, the tension of the spring 57 is overcome and then only the clutch 29 can move into clutching position and the clutch 24 is held out of clutching position.

From the foregoing it will be apparent that the change speed mechanism may be controlled in a convenient and expeditious manner merely by controlling the direction of movement of the driver, and a selected speed may be obtained merely by temporarily reversing the movement of the driver so as to throw the proper clutch into engagement with its complementary part or parts.

What I claim is:

1. In a device of the class described, the combination with a driving part and a driven part, of a change speed gear interposed between the driving part and the driven part, clutches in engagement with the driving part, one of said clutches being adapted to be moved into direct clutching position with the driven part and the other of said clutches being adapted to be moved into clutching position with the change speed gear, springs adapted to exert tension against said clutches, and means for causing one of said springs to overcome the tension of the other of said springs.

2. In a device of the class described, the combination with a driving part and a driven part, of a change speed gear interposed between the driving part and the driven part, clutches in engagement with the driving part, one of said clutches being adapted to be moved into direct clutching position with the driven part and the other of said clutches being adapted to be moved into clutching position with the change speed gear, springs adapted to exert tension against said clutches, one of said springs being normally not under tension, and means for causing said last-named spring to overcome the tension of the other spring.

3. The combination with a driving member and a driven member, of a clutch actuator rigid with the driving member and extending within the driven member, a plurality of gear elements interposed between the driven member, and the driving member and arranged one within the other, one of said elements being eccentric with the elements with which it meshes, one of said elements having a clutch face, and a clutch member actuated by the clutch actuator for engagement with the clutch face so as to enable the driving part to be connected to or disconnected from the element having a clutch face.

4. A driving part and a driven part, means for connecting the driving part rigid with the driven part, a change speed gear connected to the driven part and adapted to be connected to the driving part, said change speed gear comprising elements one within the other, and one of which is eccentric to the element with which it meshes, and means positively and directly controlled by the driving part for disconnecting the first-named means from the driven part when the driving part is connected to the change speed gear.

5. The combination with a driving and a driven element, of a variable speed mechanism interposed between the driving element and the driven element and including a plural number of clutches, and a clutch-actuator movable with the driving element and having exterior and interior threads engaging said clutches to move them to clutch said clutch-actuator directly with the driven element or with the change speed mechanism.

6. The combination with a rigid axle, of a hub about the same, a driver, means for connecting and disconnecting the driver to and from the hub, a reducing gear, a clutch for connecting said driver to the reducing gear, means for moving said clutch into clutching position comprising a spring normally inactive, and means for putting said spring under active tension.

7. The combination with a rigid axle, of a hub about the same, a driver, means for connecting and disconnecting the driver to and from the hub, a reducing gear, a clutch for connecting said driver to the reducing gear, means for moving said clutch into clutching position comprising a spring normally inactive, and means for putting said spring under active tension.

8. The combination with a rigid axle, of a hub about the same, a driver, means for connecting and disconnecting the driver to and from the hub, a reducing gear, a clutch for connecting said driver to the reducing gear, means for moving said clutch into clutching position comprising a spring normally inactive, a receiving part on said axle, and a shiftable spring compressing element for engagement with said receiving part.

9. The combination with a rigid axle, of a hub about the same, a driver, means for connecting and disconnecting the driver to and from the hub, a reducing gear, a clutch for connecting said driver to the reducing gear, means for moving said clutch into clutching position comprising a spring normally inactive, a receiving part on said axle, a shiftable spring compressing element for engagement with said receiving part, and means for clutching said shiftable element to the driver upon backward movement of the driver, and for releasing it upon forward movement of the driver.

10. The combination with a driving part having a clutch-actuator rigid therewith and extending laterally therefrom, of a hub surrounding said clutch-actuator, a change-speed gear at the end of the hub distant from the driving part, a clutch in positive engagement with the clutch-actuator and adapted to clutch the hub, a clutch to operate the change-speed mechanism, and a connection positively engaging said last-mentioned clutch and clutch-actuator and arranged to operate said clutch when the first-above-mentioned clutch is not in engagement with the hub.

11. The combination with a driving part and a driven part, a change speed mechanism interposed between the driving part and the driven part and including a shiftable clutch for engagement with the part to be clutched, means for actuating said clutch, and means axially and longitudinally shiftable and coöperating with said first named means, whereby said first named means will be effective in shifting said clutch when the last-named means is moved in one direction, and ineffective in shifting the clutch when the last-named means is moved in an opposite direction.

12. A driving part and a driven part, a change speed mechanism interposed between the driving part and the driven part and including a shiftable clutch for engagement with the part to be clutched, means for actuating said clutch, and means axially and longitudinally shiftable and coöperating with said first-named means whereby said first-named means will be effective in shifting said clutch when the last-named means is moved in one direction and ineffective in shifting the clutch when the last-named means is moved in another direction.

13. A driving part and a driven part, the driving part having a portion extending within the driven part, threads or their equivalent on the exterior of the said portion, a clutch to be actuated by said threads so as to move into and out of clutching position with the driven part, a clutch within the said portion and in threaded engagement therewith, the threads on the exterior and interior of said portion being disposed so that a movement of the driver in either direction will impart movement to said clutches in opposite directions, and a change speed gear in mesh with the driven part and adapted to be connected to the said portion of the driver through the medium of the second mentioned clutch.

14. A driven element, a driver, means for connecting and disconnecting the driver to and from the driven element, a change speed gear, a clutch for connecting said driver to the change speed gear, means for moving said clutch into clutching position comprising a spring normally inactive, a rigid member having a receiving part, and a shiftable spring compressing element for engagement with said receiving part.

15. A rigid axle, a hub about the same, a driver, means for connecting and disconnecting the driver to and from the hub, a change speed gear, a clutch for connecting said driver to the change speed gear, means for moving said clutch into clutching position comprising a spring normally inactive, a receiving part on said axle, a shiftable spring compressing element for engagement with said receiving part, and means for clutching said shiftable element to the driver upon backward movement of the driver and for releasing it upon forward movement of the driver.

16. A driver, a part rigid therewith, a driven element, a change speed gear interposed between the driving element and the driven element, and oppositely movable clutches in positive engagement with the part rigid with the driver and provided with means whereby said clutches may be shifted through movement of the driver so as to drive the driven element at the same speed as the driver or at a different speed.

17. The combination with a support, of, a driving element carried thereby, a driven element having teeth, a toothed element concentric with the said driven element and adapted to receive motion from the driving element, means for clutching and unclutching the second mentioned toothed element to or from the driven element, and a power transmitting element interposed between the driven element and said second mentioned toothed element and eccentric to both.

In testimony whereof, I hereunto affix my signature, in the presence of two witnesses.

ALBERT F. ROCKWELL.

Witnesses:
 H. N. TUTTLE,
 B. F. FUNK.

---

Correction in Letters Patent No. 942,220.

It is hereby certified that in Letters Patent No. 942,220, granted December 7, 1909, upon the application of Albert F. Rockwell, of Bristol, Connecticut, for an improvement in "Variable-Speed Mechanism," an error appears in the printed specification requiring correction, as follows: Page 5, line 11, the word "driven" should read *driving;* and that the said Letters Patent should be read with this correction therein, that the same may conform to the record of the case in the Patent Office.

Signed and sealed this 28th day of December, A. D., 1909.

[SEAL.]

E. B. MOORE,

*Commissioner of Patents.* through movement of the driver so as to drive the driven element at the same speed as the driver or at a different speed.

17. The combination with a support, of a driving element carried thereby, a driven element having teeth, a toothed element concentric with the said driven element and adapted to receive motion from the driving element, means for clutching and unclutching the second mentioned toothed element to or from the driven element, and a power transmitting element interposed between the driven element and said second mentioned toothed element and eccentric to both.

In testimony whereof, I hereunto affix my signature, in the presence of two witnesses.

ALBERT F. ROCKWELL.

Witnesses:
H. N. TUTTLE,
B. F. FUNK.

---

Correction in Letters Patent No. 942,220.

It is hereby certified that in Letters Patent No. 942,220, granted December 7, 1909, upon the application of Albert F. Rockwell, of Bristol, Connecticut, for an improvement in "Variable-Speed Mechanism," an error appears in the printed specification requiring correction, as follows: Page 5, line 11, the word "driven" should read *driving;* and that the said Letters Patent should be read with this correction therein, that the same may conform to the record of the case in the Patent Office.

Signed and sealed this 28th day of December, A. D., 1909.

[SEAL.]

E. B. MOORE,

*Commissioner of Patents.*

Correction in Letters Patent No. 942,220

It is hereby certified that in Letters Patent No. 942,220, granted December 7, 1909, upon the application of Albert F. Rockwell, of Bristol, Connecticut, for an improvement in "Variable-Speed Mechanism," an error appears in the printed specification requiring correction, as follows: Page 5, line 11, the word "driven" should read *driving;* and that the said Letters Patent should be read with this correction therein, that the same may conform to the record of the case in the Patent Office.

Signed and sealed this 28th day of December, A. D., 1909.

[SEAL.]

E. B. MOORE,
*Commissioner of Patents.*